United States Patent [19]

Kawaguchi et al.

[11] Patent Number: 5,139,901
[45] Date of Patent: Aug. 18, 1992

[54] LITHIUM SECONDARY BATTERY USING HYDRIC BORON CARBONITRIDE AS ELECTRODE MATERIAL

[75] Inventors: Masayuki Kawaguchi, Ube; Koji Nozaki, Yamaguchi; Yasushi Kita, Ube, all of Japan

[73] Assignee: Central Glass Company, Limited, Ube, Japan

[21] Appl. No.: 617,652

[22] Filed: Nov. 26, 1990

[30] Foreign Application Priority Data

Nov. 24, 1989 [JP] Japan ................. 1-305084

[51] Int. Cl.$^5$ ............. H01M 4/58; H01M 6/14; H01M 4/60; C25B 11/04
[52] U.S. Cl. ........................ 429/218; 429/194; 429/213; 429/212; 204/291
[58] Field of Search ........... 429/194, 213, 212, 218; 204/291

[56] References Cited

FOREIGN PATENT DOCUMENTS 118657 9/1984 European Pat. Off. ............ 429/218
2-52519 9/1989 Japan .
1-169080 9/1989 Japan ................... 429/218

OTHER PUBLICATIONS

Kaguku to Kogyo, vol. 42, No. 9 (1989), pp. 1558–1561.
Kaguku to Kogyo, vol. 42, No. 9 (1989), pp. 1565–1567.
Proc. Int. Conf. Chem. Vap. Dep., 3rd. (1972), pp. 747–753.

Primary Examiner—William R. Dixon, Jr.
Assistant Examiner—C. Melissa Bonner
Attorney, Agent, or Firm—Fleit, Jacobson, Cohn, Price, Holman & Stern

[57] ABSTRACT

The invention provides a lithium secondary battery using hydric boron carbonitride which is a layered compound represented by $BC_xN_yH_z$, where $0.5 \leq x \leq 12$, $0.7 \leq y \leq 1.5$, and $0.01 \leq z \leq 3$, as the active material of the negative electrode. This compound is obtained by a CVD process. The electrolyte is a solution of a lithium salt in an organic solvent. The material of the positive electrode is an oxide such as $MnO_2$ or $V_2O_5$, a sulfide such as $MoS_2$ or $TiS_2$ or a conductive organic polymer such as polyaniline. In this secondary battery Li is smoothly intercalated in and released from the hydric boron carbonitride of the negative electrode, and the energy density with respect to the active material of the negative electrode is sufficiently high. This battery bears a fairly large number of charge-discharge cycles. Also it is possible to use hydric boron carbonitride as the active material of the positive electrode of a lithium secondary battery in combination with negative electrode of metallic Li or hydric boron carbonitride with intercalation of a larger amount of Li.

15 Claims, 3 Drawing Sheets

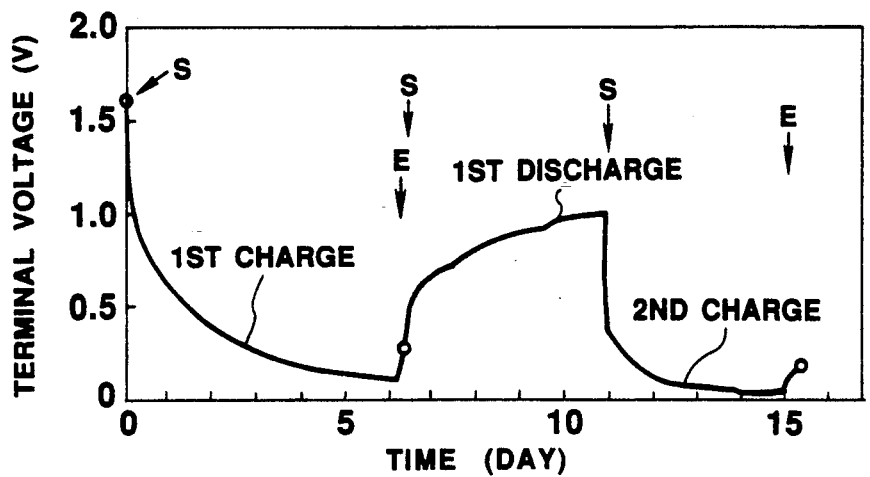
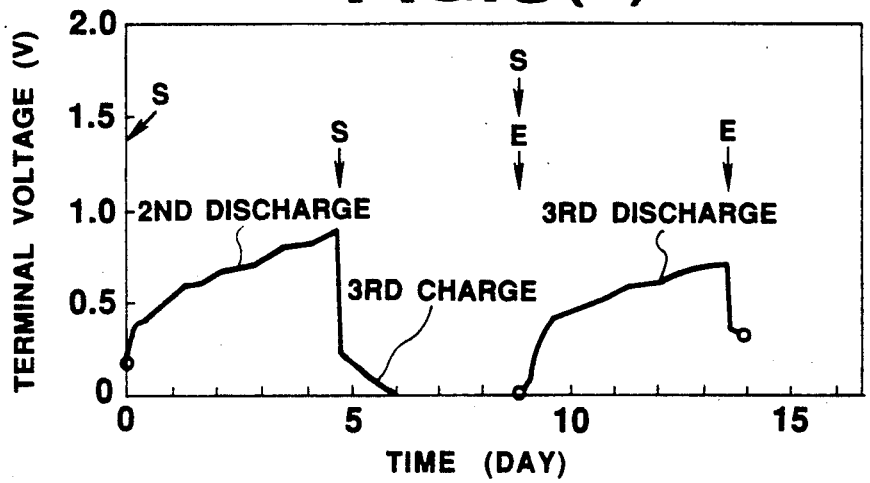
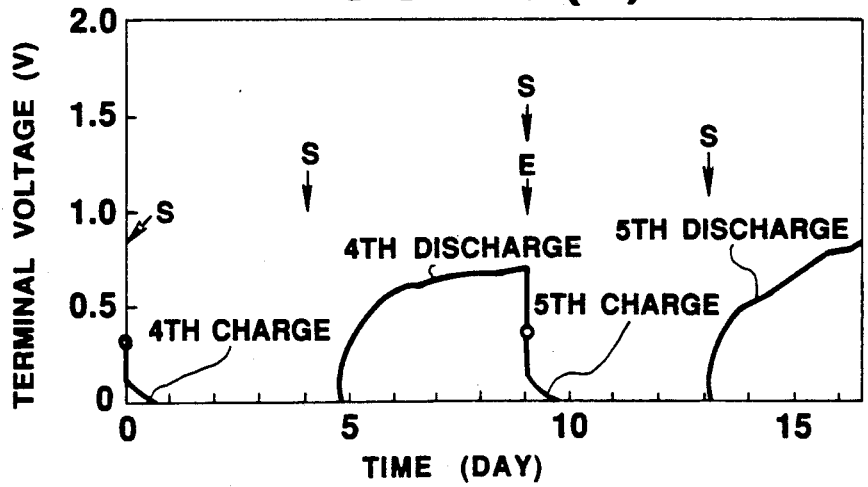

LITHIUM SECONDARY BATTERY USING HYDRIC BORON CARBONITRIDE AS ELECTRODE MATERIAL

BACKGROUND OF THE INVENTION

This invention relates to a lithium secondary battery using hydric boron carbonitride as the active material of the negative electrode or the positive electrode.

In this specification the term "battery" is used as synonymous with "a single electric cell".

With the rapid progress of electronics and the related technology, remarkable size and weight reductions of electric and electronic devices have been made as well as enhancement of the performance of the devices. Accordingly there is a strong and growing demand for batteries having high energy density and long life as the power sources for the current and future devices.

Among conventional primary batteries lithium battery is notable in respect of high energy density and has further advantages such as good storability with little deterioration and operability over a wide range of temperature. Therefore, there is a deep desire for the development of lithium secondary battery which retains the excellent properties of lithium primary battery.

In most of lithium secondary batteries developed until now metallic lithium or Li-Al alloy is used as the active material of the negative electrode and an oxide such as $MnO_2$ or $V_2O_5$ as the material of the positive electrode. However, a lithium secondary battery of this type cannot bear a large number of charge-discharge cycles, because as the charge and discharge are repeated dendrites of Li precipitate on the Li or Li-Al electrode to cause partial disintegration of that electrode and/or internal short-ciruicuiting. To solve this problem it has been proposed to use a compound which makes a reversible intercalation reaction with lithium, such as graphite or linear-graphite hybrid (LHG), as the active material of the negative electrode so that Li may be intercalated in and released from the active material during charging and discharging. Also it has been proposed to use a conductive organic polymer as the active material which incorporates and releases Li. Including these proposals the development of lithium secondary batteries is summarized in Kagaku To Kogyo (Chemistry and Chemical Industry), Vol. 42, No. 9 (1989), pp. 1558-1561, and ibid., pp. 1565-1567.

However, in the case of the negative electrode using graphite the intercalation of Li in the graphite is not smooth because of a low rate of diffusion of Li ion in the interlayer spaces of graphite, and the intercalated Li is not easily released because of strong interaction between graphite and Li. Therefore, it is difficult to realize a desirably high current density. Besides, as charging and discharging are repeated the crystallinity of the graphite reduces whereby the volume of the negative electrode increases.

In the case of using LGH the battery is liable to make internal self-discharge and is relatively small in capacity because LGH is very small in crystallite and hence weak in the power of holding intercalated Li.

In the case of using a conductive organic polymer there is a problem that the negative electrode in the charged state tends to irreversibly react with the electrolyte solution to result in an increase in internal self-discharge and a decrease in possible charge-discharge cycles. Besides, also in this case the capacity of the battery is relatively low.

SUMMARY OF THE INVENTION

It is an object of the present invention to provide a lithium secondary battery which bears a fairly large number of charge-discharge cycles without problem by using a novel active material in which Li is smoothly and reversibly intercalated.

The present invention provides a lithium secondary battery comprising, in a casing, an electrolyte which is a solution of a lithium salt in an organic polar solvent, a negative electrode which is held in contact with the electrolyte and comprises a compound represented by the general formula $BC_xN_yH_z$, where $0.5 \leq x \leq 12$, $0.7 \leq y \leq 1.5$, and $0.01 \leq z \leq 3$, as an active material in which Li is reversibly intercalated, a positive electrode which is held in contact with the electrolyte and made of a material stable to charging and discharging reactions in which lithium ion participates, and an insulating separator which is permeable to the electrolyte and is disposed between the negative and positive electrodes.

The material of the positive electrode is an oxide such as $MnO_2$, $V_2O_5$ or a lithium-containing compound oxide of Mn, a sulfide such as $MoS_2$ or $TiS_2$ or a conductive organic polymer such as polyaniline.

Herein, the compound represented by the above general formula is called hydric boron carbonitride and will be referred to as BCN(H).

BCN(H) is a layered compound with a layer structure resembling that of h-BN, graphite, disordered graphite or $B_xC$ or a composite of the layer structures of, for example, graphite and $B_xC$. BCN(H) for use in this invention can be obtained by a chemical vapor deposition (CVD) process in which a gas mixture comprising a boron source gas, a carbon source gas and a nitrogen source gas is reacted at a temperature not lower than 500° C.

JP-A 1-252519 (Oct. 9, 1989) shows the preparation of a powder, film or lump of BCN(H) by CVD and describes that the obtained BCN(H) is high in heat resistance and chemical resistance and has electrical conductivity, and Proc. Int. Conf. Chem. Vap. Dep., 3rd (1972), 747-753 shows the preparation and layered structure of a resembling compound, $(BN)_xC_{1-x}$, where $0 < x < 1$. However, there is no hint of using BCN(H) or a B-C-N system as an active material of a battery electrode.

We have discovered that Li is smoothly and reversibly intercalated in the interlayer spaces of BCN(H) by an electrochemical treatment in an electrolyte solution containing lithium ion and that the degree of interaction between BCN(H) and Li can be controlled by varying the chemical composition of BCN(H). Testing of experimental cells evidenced that during charging with respect to the BCN(H) electrode Li is electrochemically smoothly intercalated in the BCN(H) to form an intercalated compound, that during discharging Li is smoothly released from the intercalated compound, that at discharge the BCN(H) electrode exhibits a potential close to that of Li electrode and that charging and discharging can be repeated without significant changes in the charge-discharge characteristics.

BCN(H) is high in chemical resistance and is stable in the air up to a temperature of about 800° C. Accordingly there is no problem in using secondary batteries containing BCN(H) in ordinary manners.

A lithium secondary battery according to the invention is fairly high in the energy density of the active material of the negative electrode and bears a fairly large number of charge-discharge cycles, viz. more than 100 cycles, with little deterioration of the electrodes.

Also it is possible to construct a lithium secondary battery by using BCN(H) as the active material of the positive electrode and using metallic Li as the material of the negative electrode. In this case the negative electrode too may use BCN(H) instead of metallic Li on condition that a larger amount of Li is intercalated in the BCN(H) of the negative electrode than in the BCN(H) of the positive electrode.

BRIEF DESCRIPTION OF THE DRAWINGS

FIGS. 6(A), 6(B) and 6(C) are a series of charts showing constant-current charging and discharging curves obtained by repeating shallow charging and discharging of the experimental cell.

DESCRIPTION OF THE PREFERRED EMBODIMENTS

Figure 1:
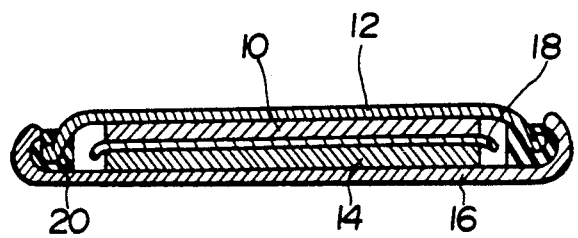
FIG. 1 is a schematic and sectional view of a lithium secondary battery according to the invention.

BCN(H) for use in this invention is prepared by a CVD process using a boron source gas, a carbon source gas and a nitrogen source gas as reactant gases preferably together with a carrier gas. A mixture of these reactant gases is subjected to reaction at a temperature not lower than 500° C.

As the boron source gas it is suitable to use a boron halide gas, and boron trichloride gas is particularly preferred. As the nitrogen source gas it is preferred to use ammonia gas mainly because of high reactivity. As the carbon source gas it is suitable to use a hydrocarbon gas such as methane, ethane, propane, ethylene, acetylene or benzene. In the case of performing the reaction at a temperature not higher than 1000° C. it is preferable to use an unsaturated hydrocarbon gas, and in this case acetylene is particularly preferred mainly because of high reactivity. In the case of performing the reaction at a temperature above 1000° C. it is rather preferable to use a saturated hydrocarbon gas. It is possible to use a nitrile gas such as acetonitrile gas as the source of both carbon and nitrogen. The proportions of the reactant gases are widely variable. On the weight basis, BCN(H) for use in this invention is composed of 6.0-40.6 wt % of B, 14.7-87.5 wt % of C, 5.8-55.5 wt % of N and not more than 10.1 wt % of H. To obtain BCN(H) of uniform quality with good reproducibility, it is preferable to use a carrier gas besides the reactant gases. For example, argon gas or hydrogen gas is suitable as the carrier gas.

The reaction of the above described mixed gases is carried out under a pressure ranging from 1 to 1000 Torr. It is impracticable to keep the pressure in the reactor below 1 Torr. To keep the pressure above 1000 Torr the reactor and the related components need to be modified in various points and hence become very costly. A preferred range of the reaction pressure is from 5 to 760 Torr. The reaction is carried out at a temperature not lower than 500° C., and preferably in the range from 900° to 2000° C. If the temperature is below 500° C. the rate of the reaction is too low for an industrial process.

The CVD operation can be performed so as to deposit a powder of BCN(H) in a reaction tube. Also it is possible to deposit a powder or a film of BCN(H) on a substrate placed in the reactor. Suitable substrate materials are metals, graphite and ceramics such as quartz and alumina. When the reaction temperature is below about 1000° C. a transition metal having catalytic activity, such as Ni or Cu, is preferred as the substrate material. When the reaction temperatrue is above 1000° C. graphite is preferred as the substrate material because of excellence in heat resistance.

In the case of depositing a film of BCN(H), the deposit becomes a thin film or a relatively thick film depending on the reaction conditions. Even a sheet or a lump thicker than 1 mm can be formed. Either in powder form or in film form the deposited BCN(H) serves as the active material of the negative or positive electrode of a lithium secondary battery. A film or sheet of BCN(H) can be used as an electrode body by itself. In using a powder of BCN(H), usually the powder is mixed with an organic binder, and the mixture is shaped into an electrode body by press molding or an alternative shaping method. As the binder, it is suitable to use a polymer which is chemically and electrochemically stable and sufficiently resistant to organic solvents, such as polytetrafluoroethylene (PTFE), polyethylene or polypropylene.

FIG. 1 shows a lithium secondary battery of coin type as an embodiment of the present invention. The battery has a negative electrode 10 in the shape of a disc placed in a dish-like metal case 12 and a positive electrode 14 in the shape of a disc placed in a dish-like metal case 16. A separator 18 is interposed between the two electrodes 10 and 14. The separator 18 is a woven or nonwoven cloth of a synthetic fiber which is electrically insulating and chemically stable, such as polypropylene or polytetrafluoroethylene, and is impregnated with an electrolyte solution (not indicated) containing Li ion. The two cases 12 and 16 are peripherally seamed together with insertion of an electrically insulating gasket 20 so as to tightly sandwich the separator 18 between the two electrodes 10 and 14. For example, the assembled battery is about 20 mm in diameter and about 1.5 mm in thickness.

The negative electrode 10 is made of BCN(H) or a mixture of BCN(H) and an organic binder which is described hereinbefore. The positive electrode 14 is made of a crystalline active material which does not change its crystal structure by charging and discharging reactions in which Li ion participates. For example, the material of the positive electrode 14 is an oxide such as $MnO_2$, $V_2O_5$ or a compound oxide of Mn represented by $\gamma\text{-}\beta\text{-}MnO_2 + LiMnO_2$, a sulfide such as $MoS_2$ or $TiS_2$, or a conductive organic polymer such as polyaniline.

The electrolyte solution is a solution of a lithium salt in an organic polar solvent. Preferably the lithium salt is selected from $LiClO_4$, $LiPF_6$, $LiPF_4$ and $CF_3SO_3Li$. The organic solvent is usually selected from propylene carbonate (PC), dimethylsulfoxide (DMSO), mixture of PC and tetrahydrofuran (THF), mixture of PC and dimethoxyethane (DME), mixture of DMSO and THF, and mixture of DMSO and DME.

The cases 12, 16 are made of a metal which does not dissolve in the electrolyte solution and has good resistance to corrosion. For example, stainless steel or tantalum is suitable as the case material.

In advance of actual use of the lithium secondary battery, Li is intercalated in the BCN(H) of the negative electrode 10. Preferably the intercalation of Li is made by an electrochemical treatment of the negative electrode 10 before assembling the battery, but it is also possible to accomplish the intercalation after assembling the battery. The intercalated Li is presumed to be in a state close to $(Li^+ + e^-)$.

The following referential examples relate to the preparation of BCN(H) by CVD.

REFERENTIAL EXAMPLE 1

As a reaction tube, a quartz tube having an inner diameter of 40 mm and a length of 1000 mm was inserted in an electric furnace so as to heat a middle section (500 mm) of the tube, and two nozzles each having an outer diameter of 6 mm were inserted into the reaction tube from the fore end outside the furnace.

After evacuating the reaction tube the middle section was heated to and maintained at 1100° C., and Ar gas was introduced into the reaction tube to keep a gas pressure of 760 Torr in the tube. Under these conditions a reaction was carried out by introducing 75 cc/min of $BCl_3$ into the reaction tube by one of the two nozzles and 75 cc/min of $CH_3CN$ carried by 558 cc/min of Ar by the other nozzle. The reaction was continued for 30 min. After that the temperature in the reaction tube was lowered. As a reaction product a blackish brown powder deposited in the reaction tube and a collector provided at the outlet end of the tube. The total weight of the deposited powder was about 1 g.

By elementary analysis the obtained powder contained 51.0 wt % of C, 25 wt % of N and 0.2 wt % of H. Assuming that the powder was composed of B, C, N and H, the amount of B was calculated to be 23.8 wt %. Deduced from these values the chemical formula of the powder was $BC_{1.8}N_{0.76}H_{0.08}$.

Figure 2:
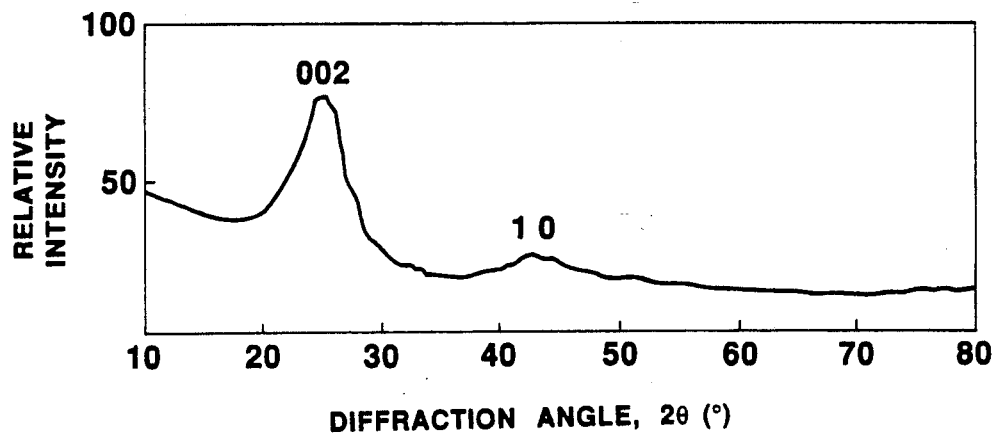
FIG. 2 is an X-ray diffraction chart of BCN(H) prepared and used in an example of the invention.

FIG. 2 shows an X-ray diffraction pattern of this powder obtained with $CuK_\alpha$. The diffraction pattern contains a broad 002 diffraction line ($2\theta = 25.4°$) and 10 diffraction line ($2\theta = 42°-44°$) and exhibits resemblance to that of disordered layer structure of graphite.

REFERENTIAL EXAMPLE 2

Using the same apparatus as in Referential Example 1 the reaction tube was evacuated, and the middle section of the reaction tube was heated to and maintained at 1000° C. Then Ar gas was introduced into the tube to keep a gas pressure of 760 Torr in the tube. Under these conditions a reaction was carried out by introducing 15 cc/min of $BCl_3$ and 30 cc/min of $C_2H_2$ into the reaction tube from the two nozzles, respectively, and simultaneously introducing 120 cc/min of $NH_3$ into the tube so as to surround the gas streams from the two nozzles. The reaction was continued for 6 hr. After that the temperature in the reaction tube was lowered. In the middle section of the reaction tube, at distances of 250-450 mm from the inlet of the electric furnace, there was a black deposit in the form of an elastaic sheet. The total weight of the deposit was about 5 g.

By elementary analysis the product in sheet form was composed of 77.0 wt % of C, 7.8 wt % of B, 14.7 wt % of N and 0.6 wt % of H. Deduced from these values the chemical formula of this product was $BC_{9.7}N_{1.5}H_{0.94}$.

This product was pulverized to make X-ray diffraction analysis of the powder. The obtained diffraction pattern was almost similar to the pattern shown in FIG. 2.

REFERENTIAL EXAMPLE 3

In a reaction tube of stainless steel, a graphite substrate (40 mm in length, 12 mm in width and 2 mm in thickness) was kept heated at 1400° C. by forcing an electric current to flow in the substrate. A double-tube nozzle was inserted into the reaction tube to introduce $BCl_3$ and $H_2$ into the reaction tube through the outer orifice of the nozzle and $CH_3CN$, $CH_4$ and Ar through the inner orifice. The gas pressure in the reaction tube was 5 Torr, and the feed rates of the reactants and carrier gases were as follows.

$BCl_3$: 400 cc/min
$H_2$: 524 cc/min
$CH_3CN$: 21 cc/min
$CH_4$: 40 cc/min
Ar: 170 cc/min The reaction was continued for 3 hr. As a result a grayish black film deposited on the graphite substrate. The total weight of the deposited film was 5.8 g.

By elementary analysis the film contained 59.4 wt % of C, 1.4 wt % of N and 0.3 wt % of H. Assuming that the film was composed of B, C, N and H, the amount of B was calculated to be 39.2 wt %.

Figure 3:
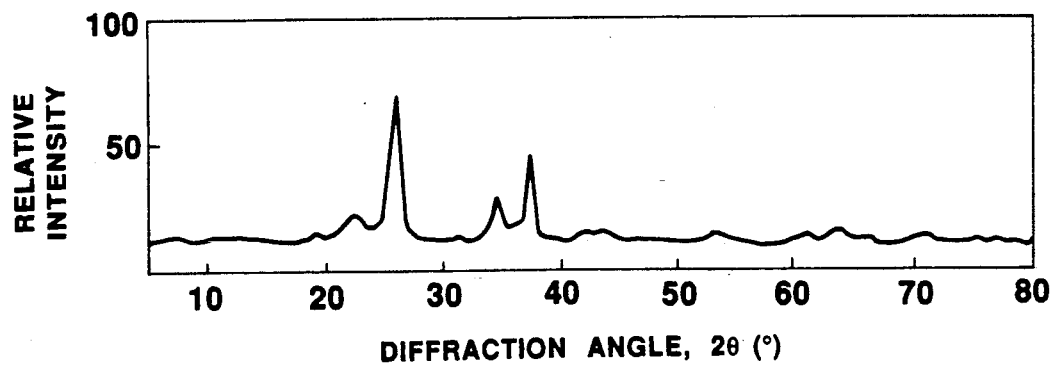
FIG. 3 is an X-ray diffraction chart of another BCN(H) prepared and used in another example of the invention.

The film was pulverized to make X-ray diffraction analysis (with $CuK_\alpha$) of the powder. The obtained X-ray diffraction pattern is shown in FIG. 3. The diffraction pattern contains diffraction lines corresponding to the 002 ($2\theta = 26.1°$) and 10 ($2\theta = 42°-44°$) lines of graphite and the 101 ($2\theta = 19.4°$), 003 ($2\theta = 22.4°$), 104 ($2\theta = 34.7°$), 021 ($2\theta = 37.5°$) and 205 ($2\theta = 53.1°$) lines of boron carbide, $B_xC$ (x is from 4 to 9). Therefore, in crystal structure the compound formed in this example was assumed to be a complex of graphite and $B_xC$.

EXAMPLE 1

The BCN(H) powder prepared in Referential Example 1 was mixed with PTFE, which was used as a binder, by dispersing 0.14 g of a fine powder of PTFE in 10 ml of an aqueous solution of ethanol, adding 0.80 g of the BCN(H) powder to the dispersion, well stirring the resultant mixture, filtering the mixture to remove the liquid, drying the solid mixture and pulverizing the dried mixture.

In a mold 60.5 mg of the powdered BCN(H)/PTFE mixture was press-shaped into a disc having a diameter of 16 mm by application of a pressure of 4500 kg/cm². The obtained disc was used as an electrode body in an experimenal cell of coin type. The opposite electrode of the cell was an elementary Li electrode, and the electrolyte was 1 mol/liter solution of $LiClO_4$ in propylene carbonate. Using stainless steel cases for the respective electrodes the cell was assembled in a dry box by interpositioning a nonwoven cloth of polypropylene impregnated with the electrolyte solution between the two electrodes.

Figure 4:
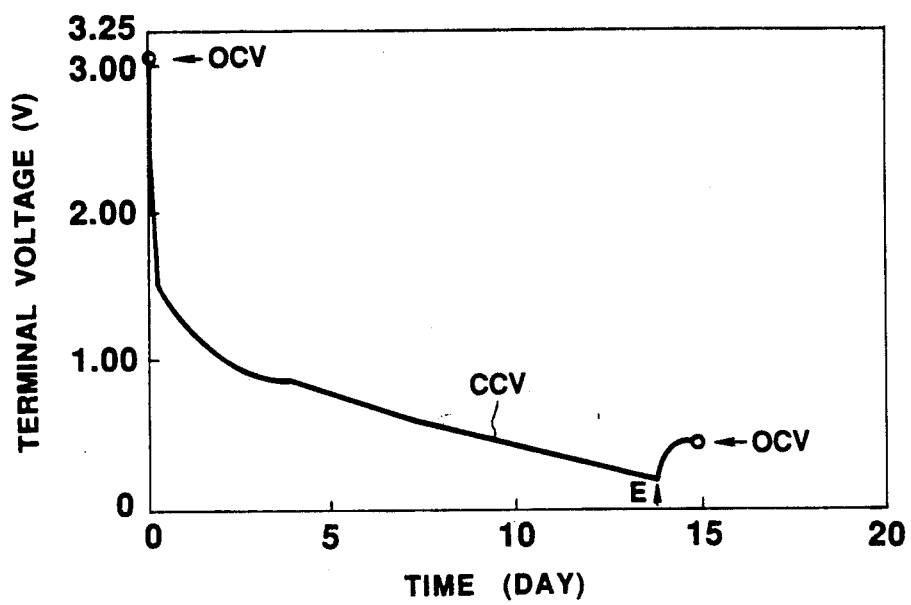
FIG. 4 is a chart showing a constant-current charging curve with respect to an electrode according to the invention in an experimental cell.

The cell was left standing for 1 day. After that the open-circuit voltage of the cell was 3.05 V at the BCN(H) electrode (vs. Li). Then constant-current charging (50 $\mu A$, 15 $\mu A/cm^2$) of the cell was performed by using the BCN(H) electrode as the negative electrode. FIG. 4 shows the charging curve with respect to the BCN(H) electrode. In FIG. 4, and also in the following FIG. 5, "OCV" stands for open-circuit voltage and "CCV" closed-circuit voltage, and the arrow "E" indicates the switching to open circuit. After 329 hr from the start of the charging the closed-circuit voltage at the BCN(H) electrode was 0.23 V (vs. Li). At this point the charging was terminated, and the chemical composition of the active material of the negative electrode was analyzed. The composition was determined to be $(BC_{1.8}N_{0.76}H_{0.08})_{1.94}Li$. Therefore, it was evidenced that during the charging operation Li was intercalated in BCN(H) of the negative electrode, and the amount of the intercalation was comparable to the maximum of chemical intercalation of Li in graphite to form an intercalation compound represented by $C_8Li$.

After 24 hr from the switching to open circuit, the open-circuit voltage was 0.47 V (vs. Li).

Figure 5:
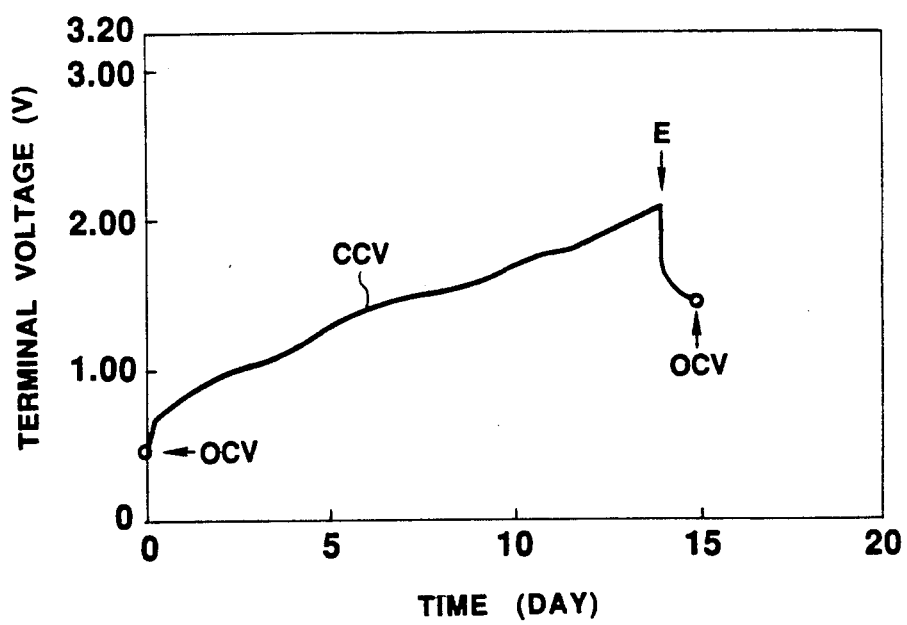
FIG. 5 is a chart showing a constant-current discharging curve with respect to the same electrode in the experimental cell.

Next, reversing the polarity of the electrodes the cell was subjected to constant-current discharging (50 $\mu$A, 25 $\mu$A/cm$^2$). FIG. 5 shows the charging curve with respect to the BCN(H) electrode. After performing the discharging operation for 329 hr (the same as the period of the constant-current charging) the open-circuit voltage at the BCN(H) electrode was 1.43 V (vs. Li).

Subsequent to the above charging and discharging operations, shallow charging and shallow discharging were repeated always at a constant current (50 $\mu$A, 25 $\mu$A/cm$^2$). The results are shown in FIGS. 6(A), 6(B) and 6(C). In these figures each arrow "E" indicates the switching to open circuit, and each arrow "S" indicates the start of charging (intercalation of Li in the BCN(H) electrode) or discharging (release of Li from the BCN(H) electrode). After 100 hr from the start of the discharging operation in each cycle the closed-circuit voltage ranged from 0.68 to 0.98 V (vs. Li).

In this case the energy density with respect to the active material of the negative electrode was 97.3 A.h/kg. This value is sufficiently high and indicates that the tested active material, BCN(H), is fully practicable in lithium cells.

The experiment in Example 1 was repeated by alternately using the BCN(H) prepared in Referential Examples 2 and 3 instead of the BCN(H) in Example 1 as the active material of the negative electrode. There was no change in the construction of the experimental cell and the testing methods. Irrespective of the origin of BCN(H) the test results were almost equivalent to the test results in Example 1.

COMPARATIVE EXAMPLE

The BCN(H) electrode in Example 1 was modified by using acetylene black in place of the BCN(H). In the degree of crystallinity the acetylene black was comparable to the BCN(H) used in Example 1. Otherwise there was no change in the construction of the experimental cell and the testing methods. In this case the cell was extremely low in capacity, and with respect to the acetylene black in the tested electrode the energy density was lower than 10 A.h/kg. The experiment was repeated by using natural graphite higher in the degree of crystallinity in place of acetylene black. Also in this case the cell was extremely low in capacity, and with respect to the graphite the energy density was lower than 10 A.h/kg.

What is claimed is:

1. A lithium secondary battery comprising:
    a casing;
    an electrolyte confined in said casing, the electrolyte being a solution of a lithium salt in an organic polar solvent;
    a negative electrode which is held in said casing so as to be in contact with said electrolyte and comprises a compound represented by the general formula $BC_xN_yH_z$, $0.5 \leq x \leq 12$, $0.7 \leq y \leq 1.5$, and $0.01 \leq z \leq 3$, as an active material in which Li is reversibly intercalated;
    a positive electrode which is held in said casing so as to be in contact with said electrode and made of a material stable to charging and discharging reactions in which lithium ion participates; and
    an insulating separator which is permeable to said electrolyte and is disposed between said negative electrode and said positive electrode.

2. A battery according to claim 1, wherein said negative electrode is substantially made of said compound.

3. A battery according to claim 1, wherein said negative electrode is made of a mixture of said compound and an organic binder.

4. A battery according to claim 1, wherein said positive electrode is made of an oxide.

5. A battery according to claim 4, wherein said oxide is selected from the group consisting of $MnO_2$, $V_2O_5$ and a compound oxide of $\gamma\text{-}\beta\text{-}MnO_2$ and $LiMnO_2$.

6. A battery according to claim 1, wherein said positive electrode is made of a sulfide selected from the group consisting of $MoS_2$ and $TiS_2$.

7. A battery according to claim 1, wherein said positive electrode is made of an electrically conductive organic polymer.

8. A battery according to claim 7, wherein said organic polymer is polyaniline.

9. A battery according to claim 1, wherein said lithium salt is selected from the group consisting of $LiClO_4$, $LiPF_6$, $LiPF_4$ and $CF_3SO_3Li$.

10. A battery according to claim 1, wherein said separator is impregnated with said electrolyte.

11. A battery according to claim 10, wherein said separator is a cloth of an organic polymer fiber.

12. A lithium secondary battery comprising:
    a casing;
    an electrolyte confined in said casing, the electrolyte being a solution of a lithium salt in an organic polar solvent;
    a positive electrode which is held in said casing so as to be in contact with said electrolyte and comprises a compound represented by the general formula $BC_xN_yH_z$, where $0.5 \leq x \leq 12$, $0.7 \leq y \leq 1.5$, and $0.01 \leq z \leq 3$, as an active material in which Li is reversibly intercalated;
    a negative electrode which is held in said casing so as to be in contact with said electrode and made of a material comprising Li;
    an insulating separator which is permeable to said electrolyte and is disposed between said negative electrode and said positive electrode.

13. A battery according to claim 12, wherein said negative electrode is made of metallic lithium.

14. A battery according to claim 12, wherein said negative electrode comprises a compound represented by said general formula on condition that a larger amount of Li is intercalated in the compound $BC_xN_yH_z$ of said positive electrode than in said compound of said negative electrode.

15. A method of producing an electrode for a lithium secondary battery, the method comprising the steps of:

reacting a gas mixture comprising $BCl_3$ gas and $CH_3CN$ gas at a temperature not lower than 500° C. thereby depositing a compound represented by the general formula $BC_xN_yH_z$, where $0.5 \leq x \leq 12$, $0.7 \leq y \leq 1.5$, and $0.01 \leq z \leq 3$;

shaping said compound into at least a portion of an electrode body; and intercalating Li into said compound in said electrode body.

* * * * *